Patented Apr. 11, 1933

1,903,686

REISSUED

UNITED STATES PATENT OFFICE

FLOYD M. REECE, OF SOUTH BEND, INDIANA, ASSIGNOR TO O'BRIEN VARNISH COMPANY, OF SOUTH BEND, INDIANA, A CORPORATION OF INDIANA

TREATMENT OF CHINA WOOD OIL TO PRODUCE A LIQUID UNGELLED OIL AND PRODUCT THEREOF

No Drawing. Application filed October 6, 1930. Serial No. 486,865.

This invention relates to the treatment of China-wood oil, sometimes known as "tung oil", for the purpose of rendering it especially adaptable for use as a drying or base oil in the manufacture of varnishes and/or a plasticizer for lacquers, for example, the pyroxylin lacquers.

The oil with which the present invention is concerned is that oil which is expressed from the berries or seeds of the tree "*Aleurites cordata*", and is known in the art as China-wood oil or "tung oil".

In prior practice the oil is prepared for use in paints or varnishes by a heat treatment, in which it is heated with natural resins or resin acids, the resulting product being admixed with natural or synthetic varnish resins or gums in the preparation of varnishes, paints and the like. The resin is first thoroughly melted and the heat treated wood oil is admixed therewith while heated, in predetermined proportions. The wood-oil and resin mixture is subjected to further heating until the oil and resin are so combined that they will not separate upon cooling. A suitable thinning medium such as turpentine, petroleum-thinner (or both) is then added to the mixture (preferably while it is still warm) to reduce it to the desired consistency. Ordinarily a suitable drier is added with the thinner, or it may be added after the thinned mixture is cooled. Such driers are ordinarily compounds of lead and manganese. It is often the practice to employ a mixture of heat treated linseed oil and heat treated wood oil as a varnish base instead of wood oil alone.

In the preparatory heat treatment of China-wood oil, as hitherto practiced, the oil is heated in the presence of a natural resin or resin-acid in large kettles or pots to temperatures of 500 to 550 or as high as 565° F. for substantial periods of time. In the heat treatment, higher temperatures are avoided, and the use of resins or resin-acids is necessary since otherwise the oil rapidly polymerizes to a solid mass or gel which is useless in the preparation of paints and varnishes.

It is well known in prior practice that when a batch of wood oil is so treated great care must be exercised and if a substantial quantity of gas begins to be evolved some resin or an acid compound is immediately added to the hot oil to control the heating operation and retard the heat-induced reaction. This control is important because if the reaction proceeds too rapidly, or too far, the finished varnish product made with the oil will be dull or smoky and will form a checked or cracked coating upon its application as a varnish.

I have found that China-wood oil may be brought to a temperature of 600° F. or higher by a heating operation conducted with such rapidity that the formation of a gel or solid mass is not permitted while the oil is passing through the temperature range (say from 550° to 600° F.) in which such polymerization and gel formation ordinarily takes place; and I have further found that when the oil is heated in such manner to temperatures above 600° F. and preferably to 650° F. or higher, oil products are secured having novel and distinctive properties. These oil products range from drying oils having novel and distinctive characteristics as base oils for paints and varnishes to non-drying oils highly effective as plasticizers in cellulose ester lacquers.

The drying oil products prepared in accordance with my invention distinguish from natural wood oil markedly in their characteristics and behavior. They are particularly advantageous, in comparison with prior wood oil products in that they dry to a clear, lustrous film, free from gas-checking, without the addition of natural resins or resin-acids, and hence may be employed with neutral resins and artificial resins in the production of coating compositions. They likewise distinguish in behavior from natural China-wood oil and the products thereof hitherto known in requiring the use of markedly smaller proportions of driers and in the greater durability and resistance of the resulting film.

The non-drying oils produced in accordance with my invention are clearly different from tung oil and products thereof hitherto known in their lack of drying properties. They are highly effective as plasticizers in cellulose ester lacquers and produce therein a remarkable degree of adhesion to the base surface, and particularly to metallic surfaces.

If China-wood oil is heated alone to temperatures of 500° F. and higher, without added substances present, a reaction takes place, which is probably a polymerization, and a gum or gel-like mass is formed. The rate of speed with which this gum or gel formation takes place increases at higher temperatures.

I have found that if such oil is heated with a sufficiently rapid rate of heat input, it may be brought to a temperature above 600° F., and preferably above 650° F. without such gum or gel formation taking place.

At such higher temperatures, say from 600° F. and preferably from 650° F. to temperatures of 800 to 900° at which excessive decomposition takes place, the oil, if brought thereto without the formation of gum or gel as hereinbefore set forth, is further changed or modified, either by polymerization or decomposition or both, as indicated, for example, by decrease in its saponification and iodine numbers and increase in its acid number.

As the temperature of operation increases, or, at a given effective temperature, with increase in time of reaction, the oil thus treated retains its drying properties although its iodine number decreases. The tendency of the film formed by the oil without addition of resins to check and crack or flatten is, however, eliminated and the durability, clearness and luster of the film are markedly improved. At the same time, the drying properties are also improved, substantially less drier being required than with the kettle cooked China-wood oil as ordinarily prepared, and the product forms a more durable and adherent film. At higher temperatures say above 675° F. and preferably above 700° F., and with increasing time of reaction, the oil, with a further loss in its saponification and iodine numbers and increase in its acid number, looses its drying properties entirely, the resulting product being a highly effective plasticizer for cellulose esters, solvent in the usual lacquer solvents and highly valuable as hereinbefore set forth.

In carrying out the present invention, China-wood oil, preferably alone, is rapidly heated to a temperature in excess of 600° F. and preferabbly 650° F. or higher with sufficient rapidity to avoid the formation of a gum or gel while passing through the usual polymerizing ring above 500° F. A temperature in excess of 600 and preferably in excess of 650° F. having been attained without thickening or solidification of the oil, the high temperature is retained until the desired modification of the oil has been secured and the product is then rapidly cooled. In producing the drying oil product, I prefer to use temperatures of about 675 to 700° F., although higher temperatures may be employed. At such higher temperatures, however, the time required for production of the desired product becomes extremely short, and the possibility of securing a non-drying product becomes greater. Consequently, in the production of the drying oil product, I prefer to use temperatures not higher than about 700° F., and preferably about 675° F., the time of heating being so controlled as to completely eliminate gas-checking or flattening of the film produced by the resulting product.

With longer time of treatment or at increased temperatures, I produce a less viscous oil without drying properties, suitable for a plasticizer, as hereinbefore set forth. In producing such a product, I prefer to employ temperatures above 700° F., and preferably 725° F. and higher, continuing the heating until the oil becomes non-drying and then rapidly cooling the oil.

In order to exercise an accurate control of the heating of the wood oil in carrying out the invention, I prefer to pass the oil through an elongated heated restricted passageway, for example, a pipe coil, mounted in a suitably fired furnace, and then immediately, or after retaining the oil at the acquired temperature for the desired length of time, discharge the heated oil into a similar passageway, preferably another pipe coil, wherein it is rapidly cooled to a temperature at which the oil does not react before it has reacted to the point of forming gum. By employing such apparatus, the rate of heating the oil and the time the oil is heated to a predetermined temperature may be closely controlled. It is preferable to force the oil through the coil under superatmospheric pressure, for example 15 to 35 pounds. However, it is to be understood that any pressure conditions may be employed so long as sufficient pressure differential is maintained between the inlet and the outlet of the coil to cause the oil to flow therethrough at a substantially uniform speed in spite of the gases formed during the reaction in the coil. The cooled, treated oil is discharged from the cooling coil into a suitable receptacle wherein any gaseous products are separated. The cooled oil is ready for use as a base oil or vehicle for varnishes or as a plasticizer for lacquers.

I have found that satisfactory results may be obtained under widely varying temperature conditions, for example, from 625 to 900° F., more or less. However, satisfactory products are formed at temperatures between 675° F. and 725° F., so there is ordinarily no reason for operating at the higher temperatures, since the reaction speed increases with higher temperatures and the process is consequently more difficult to control.

The invention will be more readily understood from the following specific examples:

Untreated China-wood oil was passed, under a pressure of 25 pounds, through a coil formed of 60 feet of one-half inch inside diameter copper tubing. The coil was of spiral or helical form and was mounted in a gas fired furnace. The oil was charged into the coil at a temperature of 75° F. and at a rate of 45 gallons per hour. The oil was discharged from the coil at a temperature of 675° F. and was immediately passed into a coil, immersed in a cooling fluid, wherein it was cooled to a temperature of 200° F. The cooled oil was thereupon passed to a receiving drum wherein any gases separate from the oil.

The resulting oil when used as a base oil or drying oil for varnishes proved far superior to the old type oil produced in the already described vat heating operation. The varnishes made from the new oil proved to be clear, extremely durable and check-proof, and dried at least as rapidly with as little as one-half the amount of drier. In fact, I have produced varnishes which will fully dry in two hours and which are of superior quality to any long or short drying varnishes made from China-wood oil or prior products made therefrom. It was found that the new oil of itself would form a clear, hard coating upon drying, a property not possessed by the old type oils which will not satisfactorily dry by themselves without added resins or acids, and when dried, form checked, clouded or smoky coatings.

The drying product formed in accordance with my invention has a lower specific gravity, lower saponification and iodine numbers and a higher acid number than the original oil from which it was produced. Thus, by an operation such as that described, a drying oil was produced having a specific gravity of 0.915 (15° C.); saponification number 183; iodine number 113, index of refraction 1.5020 (19° C.) and acid number 5.1. The China-wood oil from which it was produced had a specific gravity of 0.9360; saponification number 193, iodine number 150; index of refraction, 1.5180, and acid number 4.8.

The oil produced by the above described process was found to function in a satisfactory manner as a lacquer plasticizer. However, I have found that a better plasticizer which is non-drying is obtained by heating the oil to 700–725° F., without varying the other conditions of operation. The product so produced at a temperature of 700° F. has a lower viscosity than the product above described and is a superior plasticizer for pyroxylin lacquers. A typical product thus produced from the same China-wood oil above referred to had a specific gravity of 0.915; saponification number 174.6; iodine number 93.5; index of refraction 1.4998 and acid number 7.7.

I have also produced satisfactory vehicle oils and plasticizers at temperatures as high as 900° F., it being ordinarily necessary to shorten the time of reaction by increasing the velocity of flow through the coil.

It is to be understood that the above described conditions of operation may be varied to a considerable degree relative to time and temperature conditions. Thus, closely corresponding results may be obtained by maintaining the wood oil at higher temperatures for shorter periods of time as by maintaining the wood oil at lower temperatures for longer periods of time. However, it is to be understood that the invention does not contemplate operations at temperatures below those at which the already referred to rapid heat-induced reaction takes place. It will also be understood that the preferred varnish base oil product and the preferred lacquer plasticizer may be produced under similar temperature conditions by merely varying the period of time the wood oil is maintained at such temperature, a longer period of time being required for the production of the plasticizing product. Also, the time element may be constant and the temperature varied to produce either of the two products, a higher temperature being required for the production of the plasticizer.

The foregoing indicates that the plasticizer product results from a more extended reaction than that which forms the varnish base oil. In general, it might be said that the better drying oils result from a relatively less extensive reaction and the poorer drying oils, which have excellent lacquer plasticizing properties, result from a relatively more extensive reaction.

It will be understood that the specific details of apparatus and method hereinbefore set forth are for the purpose of illustration, and are not intended to be regarded as limitations upon the scope of the invention, except as contained in the following claims.

I claim:

1. The method of treating China-wood oil to produce a liquid, ungelled oil wherein the oil is forced rapidly through a restricted conduit of such cross-sectional area as to permit of rapid input of heat, said conduit being heated to bring the oil to a temperature of at least 625° F. in a period of time sufficient to secure substantial reduction of the refractive index of the oil and so short as not to permit gell formation, said period being suitably in the order of fifteen seconds for a temperature of 675° F. for a product having drying properties, and rapidly cooling the oil.

2. The method of treating China-wood oil to produce a liquid, ungelled oil wherein the oil is forced rapidly through a restricted conduit of such cross-sectional area as to permit rapid input of heat, applying heat to the conduit to bring the oil in passage therethrough to a temperature of 625° F. to 725° F. so rapidly that gelling does not take place while a substantial reduction in the index of refraction takes place, the time of heating being in the order of 15 seconds when the temperature attained is 675° F. and the time for other temperatures corresponding thereto, removing the oil from the coil when its index of refraction is not below 1.499 and rapidly cooling the oil to prevent gelatinization of the oil and further reduction of the index of refraction.

3. The method of modifying the drying characteristic of China-wood oil to produce therefrom a liquid product suitable for use in coating composition consisting in continuously forcing the China-wood oil through a closed conduit having a relatively large surface, supplying heat to the oil in its passage through said conduit to bring to an outlet temperature of over 625° F., correlating the rate of oil flow and heat input thereto so that, when the outlet temperature is 675° F., it is obtained in a period in the order of fifteen seconds and other temperatures above 625° F. are obtained in corresponding times, and quickly cooling the oil to a temperature in the order of 200° F. to prevent the gelatinization of the heated oil and to prevent lowering the index of refraction below 1.499.

4. The method of modifying the drying characteristics of China-wood oil to produce therefrom a liquid product suitable for use in coating composition consisting in continuously forcing the tung oil through a closed conduit of about one-half inch internal diameter at rate corresponding to a throughput of about forty-five gallons per hour for a tube of sixty foot length and heating the oil in its passage through said tube to bring it therein to an outlet temperature of about 675° F. and quickly cooling the oil to a temperature of the order of 200° F. to prevent gelatinization of the heated oil whereby an ungelled drying oil is secured having an index of refraction substantially lower than 1.518 and not below 1.499.

5. The herein described liquid ungelled China-wood oil product capable of drying to a clear lustrous film under usual atmospheric conditions having a lower specific gravity, saponification number, iodine number and index of refraction, and a higher acid number than the oil from which it was made, and having also the characteristics for varnish making of China-wood oil subjected to the process of claim 3.

6. A clear lustrous non-tacky film comprising dried China-wood oil heat-treated to lower its specific gravity, saponification number, iodine number and index of refraction and raise its acid number and to impart to it the film-forming characteristics imparted by the process of claim 3.

In testimony whereof I have hereunto set my hand this 3rd day of September, 1930.

FLOYD M. REECE.